Aug. 8, 1967  B. B. HRAPSHAW  3,334,875
HUMIDIFYING APPARATUS

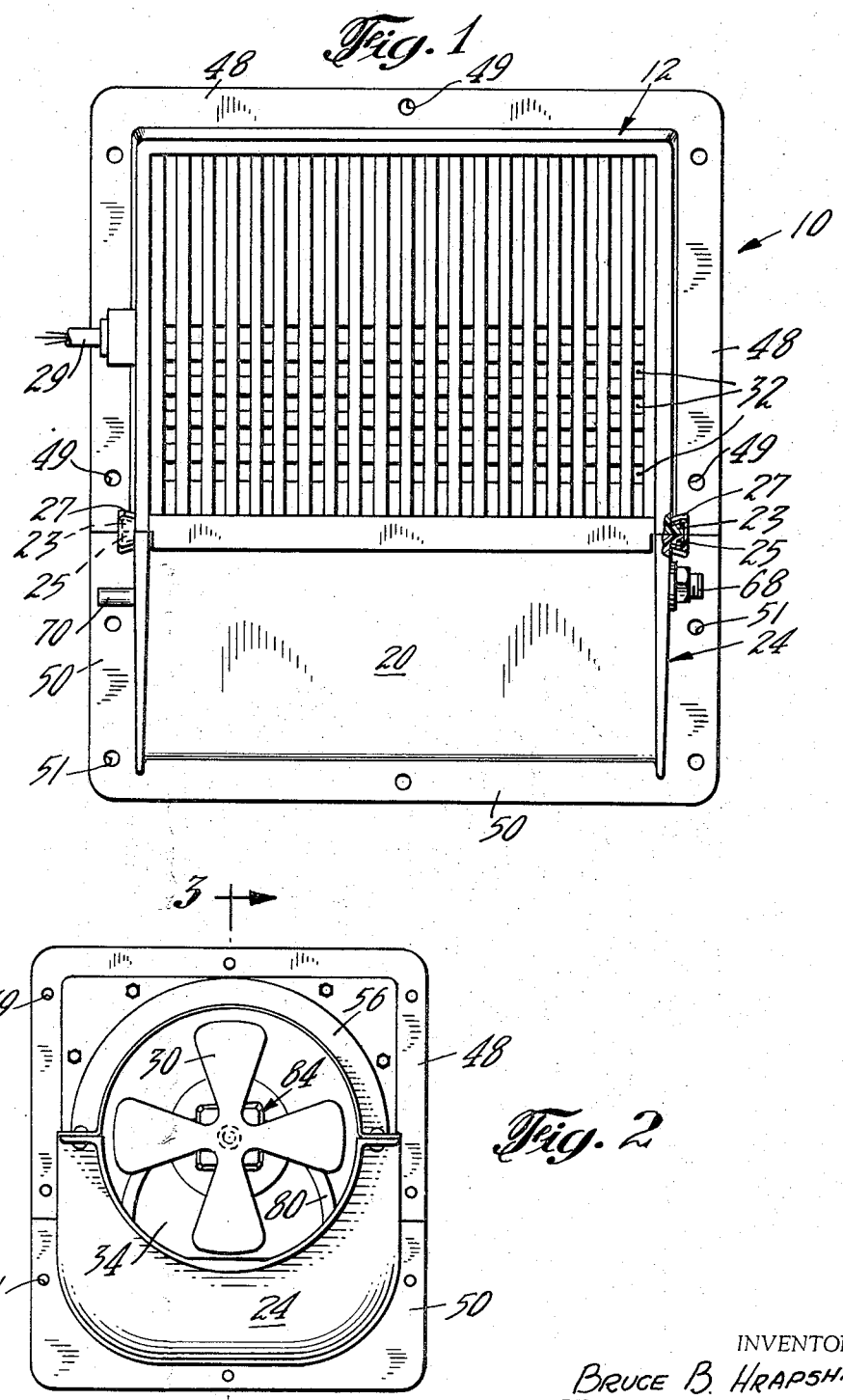

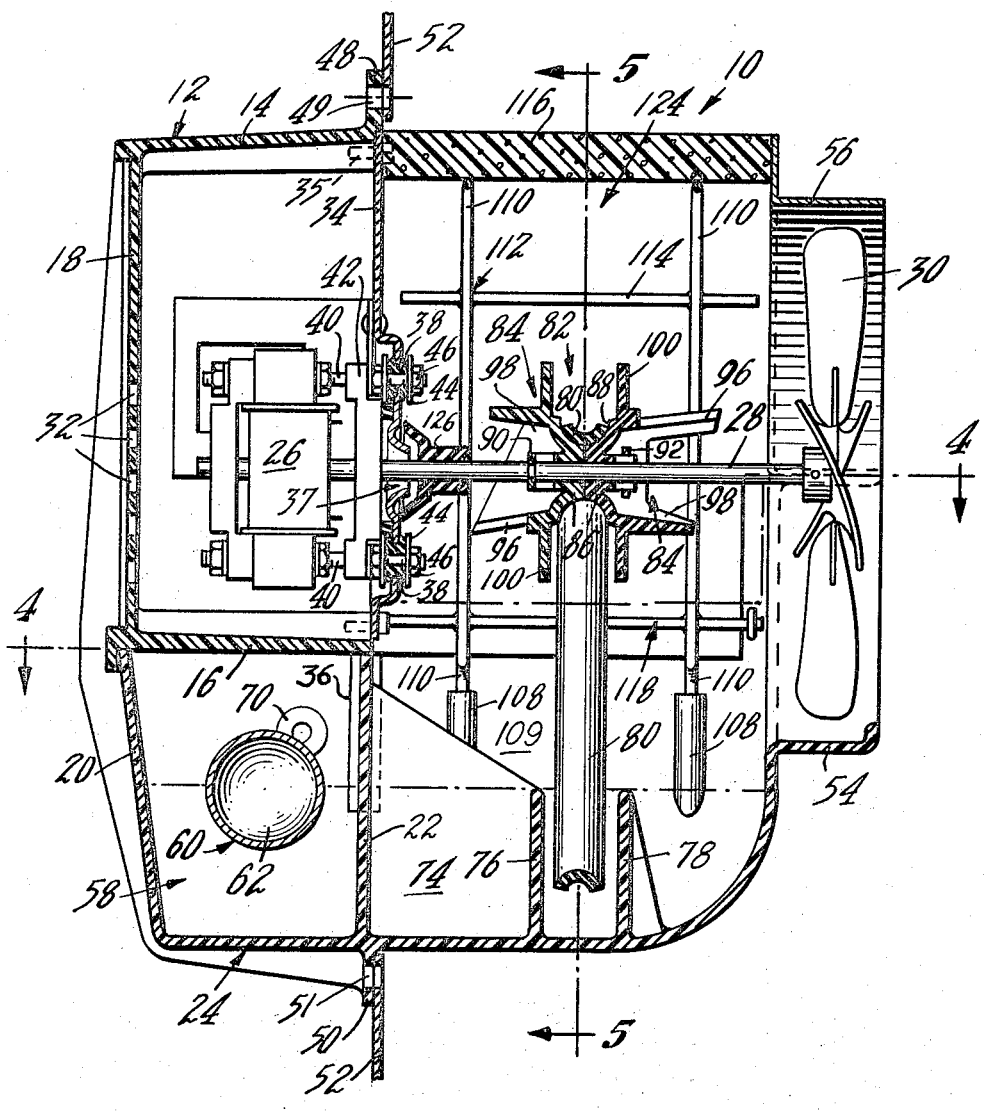

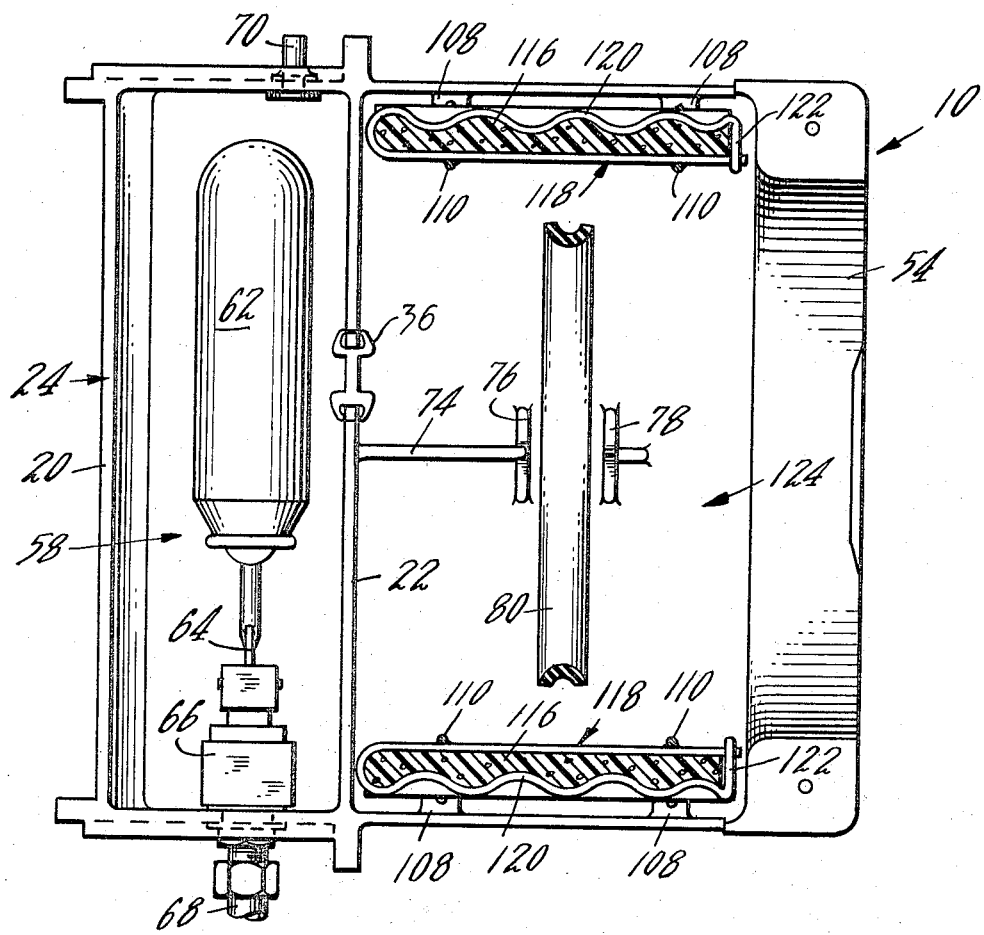

Filed Feb. 2, 1965  5 Sheets-Sheet 4

INVENTOR.
BRUCE B. HRAPSHAW
BY

ATTORNEYS

Aug. 8, 1967 B. B. HRAPSHAW 3,334,875
HUMIDIFYING APPARATUS

Filed Feb. 2, 1965 5 Sheets-Sheet 5

INVENTOR.
BRUCE B. HRAPSHAW
BY
*Teagno, Sadler & Teddy*

ATTORNEYS

United States Patent Office 3,334,875
Patented Aug. 8, 1967

3,334,875
HUMIDIFYING APPARATUS
Bruce B. Hrapshaw, Parma, Ohio, assignor to Eaton
Yale & Towne Inc., a corporation of Ohio
Filed Feb. 2, 1965, Ser. No. 429,770
16 Claims. (Cl. 261—29)

ABSTRACT OF THE DISCLOSURE

A multiple chamber humidifying apparatus wherein a liquid is drawn from a liquid chamber onto a rotating member by means of a continuous belt driven by the rotating member. The liquid thus drawn onto the rotating member is centrifugally cast onto a permeable liquid absorbing member through which air is driven by a fan member.

More particularly, this invention relates to humidifying apparatus that is particularly adapted to unusually efficiently automatically disseminate desired quantities of moisture into the atmosphere of an enclosure.

Accordingly, it is a primary object of the present invention to provide humidifying apparatus that is so constructed and arranged as to unusually efficiently automatically disseminate desired quantities of moisture into the atmosphere of an enclosure, such as any one of a plurality of rooms of an apartment, home, office, industrial structure, and the like.

Another primary object of this invention is to provide humidifying apparatus that is so constructed and arranged as to present various assemblies enabling the efficient dissemination of desired quantities of moisture into the atmosphere within an enclosure, such as any one of a plurality of rooms of an apartment, home, office, industrial structure, and the like, each of which assemblies is structurally operatively associated with each of the others as to be readily accessible for repair and/or replacement.

Yet another primary object of the present invention is to provide humidifying apparatus that is so constructed and arranged as to present various assemblies enabling the efficient dissemination of desired quantities of moisture into the atmosphere within an enclosure, such as any one of a plurality of rooms of an apartment, home, office, industrial structure, and the like, one of said assemblies being particularly adapted to contain a liquid from which said quantities of moisture are capable of being derived, said liquid-containing assembly being so constructed and arranged as to enable the automatic replenishing of liquid therewithin without the necessity of removing any one or more of said assemblies from secured positions relative thereto.

Furthermore, it is a primary object of this invention to provide humidifying apparatus that is so constructed and arranged as to present various assemblies, enabling the efficient dissemination of desired quantities of moisture into the atmosphere within an enclosure, such as any one of a plurality of rooms of an apartment, home, office, industrial structure, and the like, one of said assemblies being particularly adapted to contain a liquid from which said quantities of moisture are capable of being derived, and another of said assemblies being particularly adapted to be rotatably movable within said one assembly and through the liquid contained therein, said other assembly comprising a generally annularly configured removable moisture-receiving member, and further being so constructed and arranged as to facilitate the repair and/or replacement thereof.

An additional primary object of the present invention is to provide a humidifying apparatus that is so constructed and arranged as to present various assemblies enabling the efficient dissemination of desired quantities of moisture into the atmosphere within an enclosure, such as any one of a plurality of rooms of an apartment, home, office, industrial structure, and the like, one of said assemblies being particularly adapted to contain a liquid from which said quantities of moisture are capable of being derived, and another of said assemblies being particularly adapted to be rotatably movable in said one assembly to the liquid contained therein, said one assembly being so constructed and arranged as to provide guides for the movement of said other assembly through the liquid contained in said one assembly.

A further additional primary object of this invention is to provide humidifying apparatus that is so constructed and arranged as to present various assemblies enabling the efficient dissemination of desired quantities of moisture into the atmosphere within an enclosure, such as any one of a plurality of rooms of an apartment, home, office, industrial structure, and the like, one of said assemblies being particularly adapted to contain a liquid from which said quantities of moisture are capable of being derived, another of said assemblies being particularly adapted to be rotatably movable within said one assembly and through the liquid contained therein and a further assembly being so constructed and arranged as to support and rotate said other assembly through the liquid contained in said one assembly, said further assembly comprising a rotatable pulley which is adapted to receive and substantially uniformly disseminate liquid received thereupon from said other assembly.

A further primary object of the present invention is to provide humidifying apparatus which is so constructed and arranged as to present various assemblies enabling the efficient dissemination of desired quantities of moisture into the atmosphere within an enclosure such as any one of a plurality of rooms of an apartment, home, office, industrial structure, and the like, one of said assemblies being particularly adapted to contain a liquid from which said quantities of moisture are capable of being derived, another of said assemblies being particularly adapted to be rotatably movable within said one assembly, and through the liquid contained therein, and a third assembly being so constructed and arranged as to receive liquid from said other assembly so as to present a substantial wetted surface to that portion of the atmosphere within said enclosure circulating through said humidifying apparatus by any one or more of the remainder of the assemblies, said third assembly comprising a porous and permeable member through which said portion of the atmosphere is passed and humidified.

A still further primary object of this invention is to provide humidifying apparatus that is so constructed and arranged as to present various assemblies enabling the efficient dissemination of the desired quantities of moisture into the atmosphere within an enclosure, said assemblies being so constructed and arranged to be silent in operation, to reduce to a minimum the transmission of audible vibrations from one such assembly to another, to be compact and simple of fabrication, and yet to be structurally sound and capable of prolonged efficient operation without corrosion.

Moreover, it is a primary object of the present invention to provide humidifying apparatus which is so constructed and arranged as to be readily removably mounted within a central heating unit for humidifying heated air therein, or, alternatively, to be utilized as a portable or console unit which is readily transportable from one location to another.

Other objects and important features of the present invention will be apparent from a study of the specification following, taken with the drawings, which together show, illustrate, describe and disclose a preferred embodiment or modification of the invention and what is now considered to be the best mode of practicing the principles thereof. Other embodiments or modifications may be suggested to those having the benefit of the teachings herein, and all such other embodiment or modifications are intended to be reserved especially as they fall within the scope and spirit of the subjoined claims.

In the drawings:

FIGURE 1 is a front elevational view of a humidifying apparatus constructed in accordance with the principles of the present invention;

FIGURE 2 is a rear elevational view of the humidifying apparatus illustrated in FIGURE 1, drawn to a reduced scale;

FIGURE 3 is an enlarged cross-sectional view, taken substantially along the line 3—3 of FIGURE 2;

FIGURE 4 is a cross-sectional view, with certain parts omitted, taken substantially along the line 4—4 of FIGURE 3;

Figure 5:
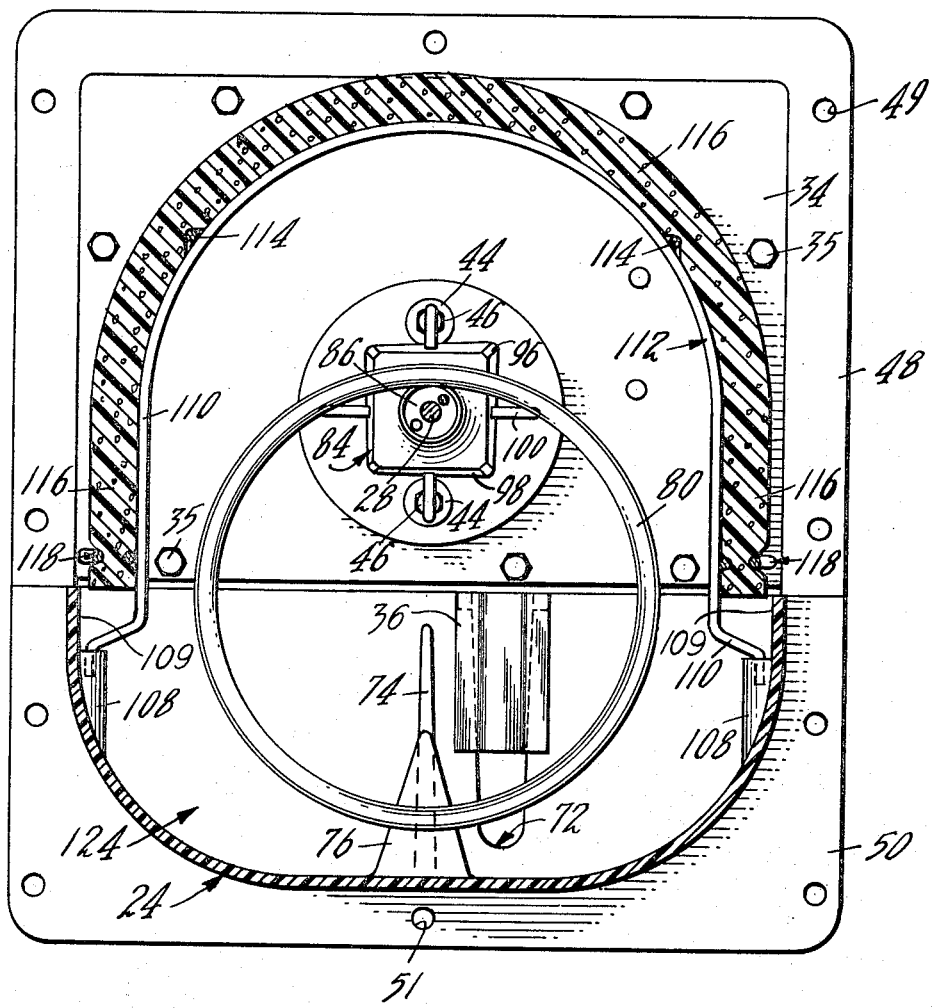
FIGURE 5 is a cross-sectional view taken substantially along the line 5—5 of FIGURE 3.
Figure 8:
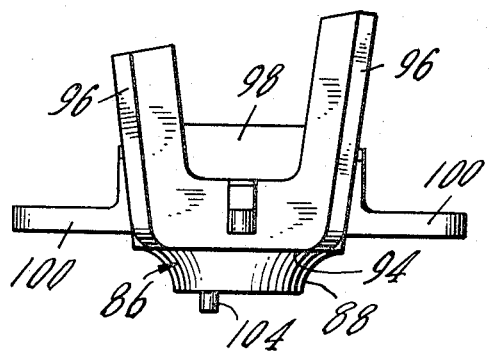
FIGURES 8 and 9 are plan views of the upper and lower portions, respectively, of the pulley half shown in FIGURE 6
Figure 6:
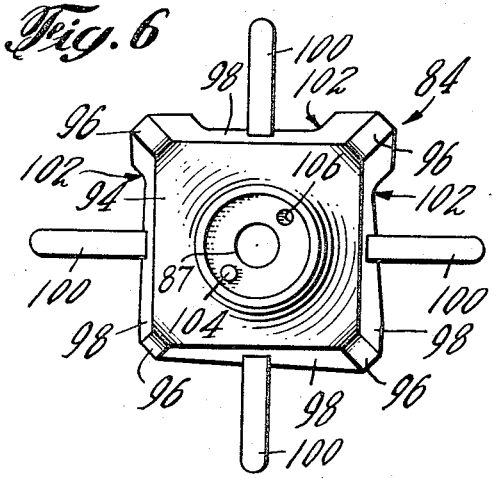
FIGURE 6 is a front elevational view of one-half of a pulley assembly, constructed in accordance with the principles of the present invention.
Figure 7:
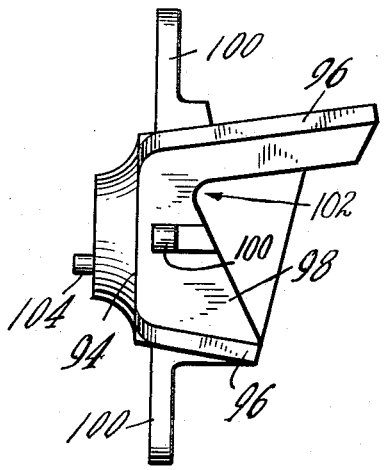
FIGURE 7 is a side elevational view of the pulley half illustrated in FIGURE 6.
Figure 9:
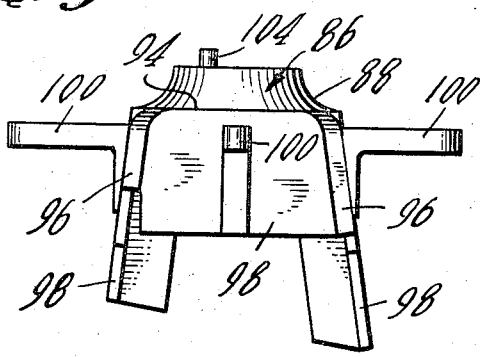

With reference now to the drawings, and particularly to FIGURES 1 through 3 thereof, there is illustrated therein humidifying apparatus 10 constructed in accordance with the principles of the present invention.

The humidifying apparatus 10 comprises a front cover or housing 12 fabricated of a suitable corrosion-free material, such as plastic, having generally planar or flat upper and lower walls 14 and 16, respectively, and a front wall 18. The lower wall 16 of the front cover 12 extends across and rests on an end wall 20, and an intermediate wall 22 of a pan assembly 24 (see FIGURE 3). The cover 12 and the pan assembly 24 are formed with mating tapered flanges 23 and 25, respectively, which are maintained in operative association or engagement with one another by resilient elongated clips 27 of generally U-shaped configuration, in cross-section (see FIGURE 1).

Positioned within the front cover 12 is a motor assembly 26 which may be of any suitable and conventional construction, and which is connected to a power source by a conductor 29. The motor assembly is utilized to rotatably drive a shaft 28, which extends longitudinally through the humidifying apparatus 10 and is connected at its opposite end to a fan member 30. The front wall of the cover 12 is provided with a series of apertures 32 therein, for the purpose of aiding in the dissipation of heat from the motor 26. A motor mounting plate 34 is secured adjacent its upper end by bolts 35, or in any other suitable manner, to the front cover 12.

The mounting plate 34 is provided with a central aperture 37 through which the drive shaft 28 extends, and a pair of generally vertically aligned apertures disposed on either side of the central aperture 37. In each of the latter apertures there is disposed a grommet or sealing ring 38, which may be shape-fitted into position therein. Extending through each of the grommets 38 is a mounting bolt 40 which is secured to the motor assembly 26. The mounting bolts 40 also extend through apertures in a mounting and positioning bracket 42, which is disposed between the motor assembly 26 and the mounting plate 34. Mounted on either side of each grommet 38 and disposed on the mounting bolt 40, is a pair of washers 44 one of which is disposed in engagement with the positioning bracket 42. A nut 46 is threaded on the inner end of each bolt 40 and serves to removably fixedly retain the motor assembly 26 on the mounting plate 34. The grommets 38 may be constructed of any suitable flexible and resilient material, such as natural or synthetic rubber, and are compressed between the washers 44 to form a liquid-tight seal for each of the apertures in which they are disposed in the mounting plate 34.

As shown in FIGURES 1 and 3, the front cover 12 and pan assembly 24 may be provided with outwardly extending flanges 48 and 50, respectively, having apertures 49 and 51 therein, which permit the mounting of the humidifying apparatus 10 on a wall or housing 52 of a furnace (not shown) by bolts (not shown), or in any other suitable manner. It will be understood, however, that the humidifying apparatus 10 may also be utilized as a portable or console unit which is readily translatable from one room to another and, in this latter instance, the mounting flanges 48 and 50 would be connected to any suitable type of movable support assembly for the apparatus.

The fan member 30 may be of any suitable and conventional construction, and may be fabricated of any suitable material such as metal, plastic, and the like. The lower portion of the fan 30, is enclosed within a generally semi-circularly configured shrouding flange 54 formed integrally with the pan assembly 24, which assembly may be fabricated of any suitable corrosion-free material such as plastic, and the like. A generally semi-circularly configured shroud member 56 encloses the upper half of the fan 30 and is secured to the pan assembly shrouding flange 54 in any suitable manner (see FIGURES 2 and 3).

With reference now to FIGURES 3 and 4, the end wall 20 and intermediate wall 22 of the pan assembly 24 define a liquid-receiving chamber 58 therebetween, in which a float assembly 60 is disposed, the function of which is to maintain a suitable liquid, such as water, in the chamber at a pre-determined level. The float assembly 60 may be of any suitable and conventional construction, and generally comprises a float member 62 which is operatively associated with or connected at one end to an actuating member 64 of a valve assembly 66. This assembly, in turn, is operatively associated with or connected to a liquid inlet conduit 68 so as to control the flow of liquid into the chamber 58, and to maintain it at the level shown in broken lines in FIGURE 3. When the liquid is at this latter level, the float member 62 is in a position to close the valve assembly 66, and, therefore, to prevent water from entering the chamber 58. If the liquid level should drop below the pre-determined level, the float 62 will then open the valve assembly 66 to admit liquid through the inlet conduit 68 into the chamber 58, until the level has again reached the pre-determined level. If the float 62 fails to close the valve 66 when the level of the liquid in the chamber 58 is at or above the pre-determined level, the liquid can only rise to the level of an overflow outlet 70, provided in the pan assembly 24 (see FIGURE 4).

The intermediate wall 22 of the pan assembly 24 is provided with an elongated generally vertically extending slot 72 therein. The slot 72 is adapted to receive a plastic insert 36 which is so constructed and arranged to partially obstruct a portion of slot 72, whereby the flow of air between humidifying zone 124 and chamber 58 is substantially eliminated. The remaining unobstructed portion of slot 72 facilitates the flow of liquid from the liquid receiving chamber 58 into the balance or remaining portions of the pan assembly. Extending generally transversely from the intermediate wall 22 is a rib 74 that merges at its opposite end with a first guide rib 76, extending upwardly from the base of the pan assembly, and disposed in substantially parallel relationship with respect to the intermediate wall 22. A second or guide rib 78 is disposed in longitudinal alignment and in parallel relationship with respect to the first guide rib 76, and is spaced therefrom a pre-determined distance for a purpose to be described hereinafter.

Each of the guide ribs 76 and 78 are of substantially the same length, and of a height which is substantially the same as the pre-determined level of liquid in the pan assembly 24, as controlled by the float assembly 60.

An annular liquid-receiving member or "slinger ring" 80 has the lower portion or flight thereof disposed between and in spaced relationship with respect to the guide ribs 76 and 78, and immersed in the liquid within the pan assembly 24. The slinger ring 80 is of generally U-shaped configuration in cross-section, and is formed of any suitable material, such as natural or synthetic rubber and the like. The upper end of the ring 80 is mounted on a pulley assembly 82, which, in turn, is positioned or mounted upon the drive shaft 28 for rotatable movement therewith. The pulley assembly 82 comprises a pair of substantially identically configured pulley halves 84 which are fabricated of a suitable corrosion-free material, such as plastic, stainless steel, and the like, and are disposed in a mutually facing cooperatively engageable relationship with respect to one another upon the shaft 28. Each of the pulley halves 84, comprises a hub portion 86 having an aperture 87 through which the drive shaft 28 extends, and a curvilinear outer surface 88 which is disposed in adjacent relationship to the complementary surface 88 on the other pulley half. There is thus defined a generally U-shaped support surface on which the inner surface of the slinger ring 80 rests. The radial dimensional extent or radius of curvature of the U-shaped support surface of the pulley assembly 82 is substantially the same as that of the inner surface of the slinger ring 80. A pair of locking rings 90 and 92 are particularly adapted to perform the function of retaining the pulley halves 86 in a pre-determined position upon the shaft 28, in which position the lower portion of the slinger ring 80 is disposed between and spaced from the guide ribs 76 and 78.

As shown in FIGURES 6 through 9, each pulley half 84 comprises a face 94 of generally rectangular or square configuration, which extends outwardly from the hub portion 86 thereof. Extending rearwardly and outwardly from the corners of the face 94 are a plurality of tapered fins 96, having generally planar or flat outer faces. Between the fins 96, each pulley half 84 is provided with or comprises a generally transversely extending connecting portion 98 from which protuberances or posts 100 outwardly extend. Each of the posts 100 is disposed generally medially between the fins 96 adjacent thereto. The fins 96 and the posts 100 are particularly adapted to perform a function that will be described in detail hereinafter. Three of the four connecting portions 98 between the fins 96 of each pulley half are provided with cut-out portions 102 of a pre-determined configuration for the purpose of providing dynamic balance for the pulley assembly 82 as it is rotatably moved or translated with the drive shaft 28, enabling a reduction in vibration and consequent wear on the bearings of the motor assembly 26. In the pulley assembly 82, as shown in FIGURE 3, it will be understood that the pulley halves 84 are disposed in the aforesaid facing relationship approximately 180° out of phase with respect to one another, so that the fin 96 of greatest longitudinal dimensional extent or length of each pulley half 84 is placed 180° from a corresponding one of the fins 96 on the adjacent pulley half. This position of the pulleys may be effected by the interlocking arrangement illustrated in FIGURES 6 through 9 wherein the hub portion 86 of each pulley half is provided with a pin 104 and a corresponding bore 106 annularly spaced at approximately 180°. When the pulley halves are assembled therefore the pin 104 on each pulley half 84 inserted into the bore 106 of the opposite pulley half, thereby maintaining the pulley halves in the pre-determined position shown in FIGURE 3.

Referring now to FIGURES 3 through 5, the pan assembly 24 is provided with a pair of receiving pockets 108 on each side wall 109 thereof, the receiving pockets of each pair being disposed on opposite sides of the slinger ring 80. Each receiving pocket 108 is particularly adapted to slidably receive therein the end portion of a rod member 110 of generally U-shaped configuration, which forms part of a supporting frame 112 disposed between the motor mounting plate 34 and the fan member 30. The supporting frame 112 is provided with a pair of transverse rods 114 which are secured to the U-shaped rods 110 to maintain them in a predetermined spaced relationship so that they can be easily inserted into the receiving pockets 108 of the pan assembly 24.

The supporting frame 112 serves to support a generally rectangularly configured porous and permeable liquid-receiving member 116, which is deformed over the frame 112 into a U-shaped configuration, and is retained in position thereupon by a plurality of spring clips 118, secured on opposite sides of the frame to the rods 110. Each of the spring clips 118 is provided with an integral undulating arm 120 that is particularly adapted to firmly grip the porous and permeable member 116 when a transverse hook arm 122 formed integral therewith retainably engages the straight portion of the spring clip which is disposed in engagement with the rod 110. The liquid-receiving member 116 may be removed from the frame 112 by releasing the hook arm 122 from the straight portion of the clip 118 to thereby release the undulating arm 120 from tight engagement with the receiving member.

The liquid receiving member 116 preferably is formed of a porous and permeable, foam-like material such as a flexible ester-type polyurethane. An example of such a material is "Scott Filter Foam" which is sold by the Scott Paper Company. It is noted, however, that any suitable material which is sufficiently porous to absorb a suitable liquid, such as water, and which is sufficiently permeable to allow air to pass therethrough, may be used for the liquid-receiving member 116 the function of which will be more readily apparent from the description hereinafter.

As particularly illustrated in FIGURE 3, the liquid-receiving member 116 is disposed between the fan shrouding members 54 and 56, and the motor mounting plate 34, to define therebetween a humidifying zone 124 comprising the pulley assembly 82 the slinger ring 80 mounted thereupon, and the portion of the pan assembly 24 comprising the guide ribs 76 and 78. It is noted that the motor assembly 26 is isolated from the humidifying zone 124 by the motor mounting plate 34, the sealing grommets 38 surrounding the motor mounting bolts 40, and by a generally frusto-conical sealing member 126 fixedly mounted upon the drive shaft 28 for rotation therewith and disposed closely adjacent the central aperture 37 in motor mounting plate 34. The sealing member 126 effectively prevents any liquid in the humidifying zone 124 from entering the central aperture 37 in the motor mounting plate 34 through which the drive shaft 38 extends. In operation, when the humidifying apparatus 10 is to be used in conjunction with a hot air heating unit, as shown generally in FIGURE 3, the front cover flange 48 and the pan assembly flange 50 would be bolted or otherwise suitably secured to the exterior of the furnace wall 52, so that the humidifying chamber 124 and the fan member 30 would be disposed within the furnace plenum. The fan 30 is driven by the motor assembly 26 in a direction to draw air from the furnace plenum, through the shrouding members 54 and 56, into the humidifying chamber 124. The rotation of the drive shaft 28 causes similar rotatable translation of the pulley assembly 82 fixedly secured thereto, and, due to the friction between the slinger ring 80 and the U-shaped surface 88 on each of the pulley halves 84 in contact therewith, the slinger ring 80 is caused to rotate through the liquid in the pan assembly 24, and between the guide ribs 76 and 78 of the pan assembly. This movement of the slinger ring 80 through the liquid in the pan assembly 24 results in liquid being carried upwardly on the U-shaped outer surface of the ring 80 to the pulley assembly 82. The liquid on the portion of the ring in engagement with the pulley assembly 82 is to travel, by centrifugal force and surface tension of the water, on to the adjacent portions of each of the pulley halves 84 to the terminal points of the fin members 96, the connecting portions 98 therebetween, and the posts 100, from which terminal points the liquid is thrown outwardly by centrifugal force against the porous and permeable liquid-receiving member 116. Since the fin members 96 and the connecting portions 98 therebetween of each pulley half 86 are of varying lengths, and, thus, the terminal points thereof vary in axial location, there results a substantially even distribution of liquid from the pulley assembly 82 to the liquid-receiving member 116, enabling a substantially uniform wetting of the porous liquid-receiving member. The hot air that is drawn from the furnace plenum through the fan 30 and into the humidifying chamber 124 is forced outwardly through the permeable wetted member 116 and, therefore, is humidified to a pre-determined extent prior to leaving the furnace and being conveyed to a room or rooms to be heated.

If the humidifying apparatus of the present invention is to function as a portable or console unit, that is, one which can be translated from room to room with facility to humidify ambient air, then the front cover mounting flange 48 and the pan assembly mounting flange 50 could be removably fixedly secured in any suitable manner to any suitable or conventional type of easily carried and movable supporting frame (not shown).

When the instant humidifying apparatus is to be used as such a portable or console unit, the fan member 30 is so constructed and driven as to move air in the opposite direction from the flow of air that occurs when the humidifying apparatus is used with a furnace as described above. In this instance, ambient air is drawn into the humidifying chamber 124 through the wetted porous and permeable member 116, and thence the humidified air forced outwardly by the fan 30 through the shrouding members 54 and 56. Aside from this difference in the flow of air, the operation of the other assemblies of the instant humidifying apparatus 10 would be substantially the same whether the apparatus is utilized with a furnace or as a portable or console unit.

It will be readily understood that the humidifying apparatus 10 of the present invention may be disassembled for cleaning, repair and/or replacement of parts with extreme facility. The front cover member 12 may be readily removed from the furnace wall 52, or a movable supporting frame (if it is used as a portable unit) by merely removing the bolts or other securing means which are positioned in the apertures 49 of the mounting flange 48 of the cover 12, and by removing the resilient clips 27 which secure the cover 12 to the adjacent portion of the pan assembly 24. When the front cover 12 is removed, since the motor mounting plate 34 is secured thereto, the entire motor assembly 26, the drive shaft 28, and the pulley assembly 82 and slinger ring 80 positioned thereupon, as well as the fan 30, can readily be removed as a unit from the humidifying apparatus 10.

In addition, it will be understood that the liquid-receiving member 116 may readily be removed from the support frame 112 by merely releasing the spring clips 118 mounted upon the frame, and the frame 112 thence readily removed from the pan assembly 24 by merely pulling the U-shaped rods 110 thereof out of the pockets or receptacles 108 formed in the side walls of the pan assembly. The pan assembly 24 will then be fully exposed for easy access to the float assembly 60 if it should be necessary to service this assembly.

While the invention has been shown, illustrated, described and disclosed in terms of embodiments or modifications which it has assumed in practice, the scope of the invention should not be deemed to be limited by the precise embodiment or modification herein shown, illustrated, described or disclosed, such other embodiments or modifications intended to be reserved especially as they fall within the scope of the claims here appended.

What is claimed is:

1. Apparatus for humidifying air comprising:
an enclosure defining multiple chambers including a liquid containing chamber and a humidifying chamber, the humidifying chamber having an inlet and an outlet defining an air flow path;
means for forcing air through the humidifying chamber;
a porous air permeable liquid receiving member located within the humidifying chamber and disposed in the air flow path;
rotatable pulley means located within the humidifying chamber for transferring liquid to the liquid receiving member; and
a continuous ring member surrounding the pulley means and disposed to be driven by the pulley means through the liquid chamber to transfer liquid from the liquid chamber onto the pulley means;
the pulley means having portions axially spaced from each other and an intermediate ring carrying portion, the axially spaced portions having an increasing radial dimension from the ring carrying portion throughout the axial extent of the pulley means, and each axially spaced portion having water throwing surface means located at a maximum and a minimum axial dimension measured from the ring carrying portion.

2. Apparatus for humidifying air comprising:
an enclosure defining multiple chambers including a liquid containing chamber and a humidifying chamber, the humidifying chamber having an inlet and outlet defining an air flow path;
means for forcing air through the humidifying chamber;
a porous, air permeable liquid receiving member located within the humidifying chamber and disposed in the air flow path;
rotatable pulley means located within the humidifying chamber for transferring liquid to the liquid receiving member; and
a continuous ring member surrounding the pulley means and disposed to be driven by the pulley means through the liquid chamber to transfer liquid from the liquid chamber onto the pulley means;
the pulley means having a ring carrying portion, a series of radial projections adjacent either side of the ring carrying portion, and end portions, adjacent either side of the ring carrying portion, of increasing radial dimension measured along an axis away from the ring carrying portion, each end portion having water throwing surface means located at a maximum and minimum axial dimension measured from the ring carrying portion.

3. The humidifying apparatus of claim 2 wherein:
the portion of the enclosure defining the liquid containing chamber further comprises:
a plurality of guide ribs extending into the liquid containing chamber for limiting the axial movement of the ring.

4. The humidifying apparatus of claim 2 wherein:
the enclosure comprises:
a lower portion defining the liquid containing chamber and having an outwardly extending peripheral flange, a removable upper portion defining the humidifying chamber and having an outwardly extending peripheral flange adapted to be disposed in a mutually engageable relationship to the flange of the lower portion, and an elongated clip member positioned about the flanges and resiliently engaging them to removably retain the upper portion on the lower portion.

5. The humidifying apparatus of claim 2 wherein:
the ring carrying portion of the pulley means is shaped to conform to the configuration of one surface of the ring.

6. The humidifying apparatus of claim 5 wherein:
the continuous ring has a generally U-shaped cross-section.

7. The humidifying apparatus of claim 2 wherein:
the pulley means comprise:
a rotatable shaft and a pair of identical pulley halves disposed adjacent each other on the shaft with the parting line of the pulley halves being located at the ring carrying portion.

8. The humidifying apparatus of claim 7 wherein:
the pulley halves are aligned with respect to each other on the shaft such as to provide dynamic balance during rotation of the shaft.

9. The humidifying apparatus of claim 7 wherein there is provided:
an electric motor mounted on the enclosure and located within the humidifying chamber for rotating the shaft and pulley.

10. The humidifying apparatus of claim 9 wherein the means for forcing air through the humidifying chamber comprises:
a fan member mounted on the rotatable shaft for rotation therewith.

11. The humidifying apparatus of claim 10 wherein:
the fan member is mounted on the rotatable shaft proximate one end of the flow path through the humidifying chamber.

12. The humidifying apparatus of claim 10 wherein:
the porous air permeable liquid receiving member is fabricated of a foam-like material.

13. Humidifying apparatus for imparting a liquid vapor to air comprising:
an enclosure defining multiple chambers, one chamber being a liquid containing chamber, another chamber being a humidifying chamber, the enclosure having two apertures therethrough for defining an air flow passage through the hlmidifying chamber;
a porous air permeable liquid receiving member mounted on the enclosure located within the humidifying chamber and exposed to air flow therethrough;
a motor driven fan mounted on the enclosure and located proximate one end of the air flow path for forcing air through the humidifying chamber;
a motor driven rotatable pulley assembly mounted on the enclosure and located within the humidifying chamber for transferring liquid to the liquid receiving member, the pulley assembly having a pair of identical pulley halves, the pulley halves being a configured first portion and a second portion, the second portion having a plurality of fin members extending generally outwardly and rearwardly from the first configured portion, each of the fin members being radially inclined and each having a different axial dimension from the other, and a third portion contiguous with the first and second portions, the third portion being a plurality of radial protrusions around the periphery of the pulley; and
a continuous ring surrounding the pulley assembly and configured to be driven by the first portion of the pulley, the ring being adapted to pass through the liquid chamber and transfer liquid from the liquid chamber to the pulley whereby the ring is rotatably driven through the liquid and retains an amount of liquid thereon, as the ring passes the pulley the liquid is transferred to the pulley and is thereafter deposited on the remote liquid receiving member by centrifugal force with the radial protrusions and the pulley fins depositing a substantially uniform amount of liquid over the axial dimension of the pulley assembly.

14. The humidifying apparatus of claim 13 wherein:
the configuration of the first portion of the pulley is substantially U-shaped.

15. The humidifying apparatus of claim 14 wherein:
the inner-surface of the continuous ring conforms to the substantially U-shaped portion of the pulley, and the continuous ring is substantially U-shaped in cross-section.

16. The humidifying apparatus of claim 15 wherein:
that portion of the enclosure defining the liquid containing chamber is further characterized by protrusions extending into the liquid containing chamber and serving as guides for the continuous ring.

References Cited
UNITED STATES PATENTS

| | | | |
|---|---|---|---|
| 1,903339 | 4/1933 | Kehoe | 261—92 XR |
| 2,105,887 | 1/1938 | Langford | 261—80 XR |
| 2,767,638 | 10/1956 | Davis | 261—92 XR |
| 2,896,424 | 7/1959 | Rose | 261—92 XR |
| 2,970,824 | 2/1961 | Caplow | 261—92 |
| 3,034,772 | 5/1962 | Schulz. | |
| 3,149,626 | 9/1964 | Wentling et al. | |
| 3,168,596 | 2/1965 | Jamison | 261—91 XR |
| 3,193,259 | 7/1965 | Liebmann. | |

FOREIGN PATENTS 890,254   2/1962   Great Britain.

HARRY B. THORNTON, *Primary Examiner.*

T. R. MILES, *Assistant Examiner.*